(12) United States Patent
Douglas

(10) Patent No.: US 6,826,685 B1
(45) Date of Patent: Nov. 30, 2004

(54) METHOD AND SYSTEM FOR THE DIGITAL CERTIFICATE GENERATION AND DISTRIBUTION

(75) Inventor: Daniel Graham Douglas, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/095,230

(22) Filed: Jun. 10, 1998

(51) Int. Cl.[7] .............................................. H04L 9/00
(52) U.S. Cl. ....................... 713/168; 713/175
(58) Field of Search ............................ 713/168–170, 713/155–157, 175, 201

(56) References Cited

U.S. PATENT DOCUMENTS

| | | | | |
|---|---|---|---|---|
| 5,001,752 A | * | 3/1991 | Fischer | 713/178 |
| 5,604,804 A | * | 2/1997 | Micali | 713/157 |
| 5,825,890 A | * | 10/1998 | Elgamal | 713/151 |
| 5,884,270 A | * | 3/1999 | Walker | 705/1 |
| 6,021,495 A | * | 2/2000 | Jain et al. | 713/201 |
| 6,035,402 A | * | 3/2000 | Vaeth et al. | 713/201 |
| 6,178,409 B1 | * | 1/2001 | Weber et al. | 705/79 |

OTHER PUBLICATIONS

Smith, R. E. Internet Cryptography. Addison Wesley Longman, Inc. 1997. pp. 313–320.*

Berners–Lee et al. "Hypertext Transfer Protocol—HTTP/1.0" Request For Comments: 1945. Published on the Internet. May 1996. pp. 31.*

"Java Security Architecture" Published on the Internet by Sun Microsystems. Oct. 1, 1997. Section 6.1. Retrieved through the Internet at <www.sdsu.edu/doc/jdk1.2/docs/guide/security/spec>.*

"What's New in VM:Webserver Release 2.0" Published on the Internet by Sterling Software, Inc. Dec. 1997. Retrieved through the Internet at <www.vm.sterling.com>.*

"VM:Webgateway Web Server; Reference–Commands" Sterling Software, Inc. 1998. Retrieved through the Internet at <www.oes–cs.dk/VM:Webgateway/help/commands/certreq.html>.*

"Domino Go Webserver Messages" Published on the Internet via IBM BookManager BookServer. May 8, 1998. Retrieved through the Internet at <www.s390.ibm.com:80/bookmgr–cgi/bookmgr.cmd/BOOKS/FIGMSG00/1%2e8>.*

* cited by examiner

*Primary Examiner*—Kim Vu
*Assistant Examiner*—Hosuk Song
(74) *Attorney, Agent, or Firm*—Sawyer Law Group LLP

(57) ABSTRACT

Method and system aspects for automated generation and distribution of certificates in a computer network of computer systems are described. These aspects include generating a request by a first computer system for a certificate from a second computer system, and responding to the request in the second computer system by automatically generating the certificate and distributing the certificate to the first computer system. Further, generating a request includes issuing a POST/CERTREQ request, and sending a self-signed certificate from the first computer system to the second computer system using HTTP. Automatically generating the certificate includes sending a sequence of certificates to the first computer system, the sequence of certificates including the newly generated certificate of the first computer system with a signature from the second computer system and a self-signed certificate from the second computer system.

24 Claims, 3 Drawing Sheets

METHOD AND SYSTEM FOR THE DIGITAL CERTIFICATE GENERATION AND DISTRIBUTION

FIELD OF THE INVENTION

The present invention relates to digital certificates, and more particularly, to the generation and distribution of digital certificates.

BACKGROUND OF THE INVENTION

Many methods have been developed to secure the integrity of electronic message data during transmission. Simple encryption is the most common method of securing data. Encryption suitably refers to the transformation of plaintext data into an unintelligible form known as ciphertext. Encryption is usually accomplished by the application of mathematical algorithms on the plaintext data. These algorithms are defined by parameters known as 'keys'. Two common encryption methods are symmetric methods, which use private keys, and asymmetric methods, which use public keys. Both private key encryption (such as DES (Data Encryption Standard)) and public key encryption methods have been implemented, but, key cryptographic methods alone do not allow a recipient to authenticate the validity of the public key nor to validate the identity of the sender.

In general, authentication allows for the verification that someone or something is valid or genuine. Digital signature authentication allows the receiver of a message to be confident of the identity of the sender and/or the integrity of the message. Digital signatures have been used to guarantee the validity of a public key by being incorporated into a digital certificate. The 'signed' document containing the digital signature attests to the validity and public key of the person signing the message, and prevents one user from impersonating another through a phony key pair. Along with the public key and the subject name, the certificate also contains the validity period of the key, the name of the issuer of the certificate and the certificate serial number. The information in the certificate is digitally signed by the issuer. However, a secure, centralized repository is required for storing and managing the keys.

For example, the X.500 directory may be used as a repository for storing certificates, with association of the public keys of network users with their distinguished name. (An X.500 distinguished name refers to a unique object in the X.500 Directory, and is a sequence of vertex points leading from the 'root' of the tree to the object of interest, as is conventionally understood). The X.500 standard defines an authentication framework, known as X.509, for use by OSI (Open Systems International connection) applications to provide a basis for authentication and security services. The X.509 framework describes how authentication information is formed and placed in the directory. The X.509 authentication framework also defines basic security services, including simple and strong authentication. Strong authentication involves the use of public key cryptographic standard (PKCS) and a trusted hierarchy of Certificate Authorities (CAs), where a CA refers to a trusted source for obtaining a user's authentication information or certificate and that controls a Public Key Infrastructure (PKI). Thus, traditional methods of key generation and certificate distribution rely on human interaction with CAs.

Accordingly, a need remains for a streamlined way of generating identities for widely distributed applications that use PKI for authentication. The present invention addresses such a need.

SUMMARY OF THE INVENTION

The present invention provides method and system aspects for automated generation and distribution of certificates in a computer network of computer systems. These aspects include generating a request by a first computer system for a certificate from a second computer system, and responding to the request in the second computer system by automatically generating the certificate and distributing the certificate to the first computer system. Further, generating a request includes issuing a POST/CERTREQ request, and sending a self-signed certificate from the first computer system to the second computer system. Automatically generating the certificate includes sending a sequence of certificates to the first computer system, the sequence of certificates including the newly generated certificate of the first computer system with a signature from the second computer system and a self-signed certificate from the second computer system.

Through the present invention, the generation and distribution of digital certificates for use by communicating Java™ applications for authentication are effectively achieved. A straightforward approach utilizes standard HTTP protocol in conjunction with a Java development kit version 1.1. These and other advantages of the aspects of the present invention will be more fully understood in conjunction with the following detailed description and accompanying drawings.

DETAILED DESCRIPTION OF THE INVENTION

The present invention relates to generation and distribution of authentication certificates. The following description is presented to enable one of ordinary skill in the art to make and use the invention and is provided in the context of a patent application and its requirements. Various modifications to the preferred embodiment will be readily Ad apparent to those skilled in the art and the generic principles herein may be applied to other embodiments. Thus, the present invention is not intended to be limited to the embodiment shown but is to be accorded the widest scope consistent with the principles and features described herein.

Further, the present invention is described in a preferred embodiment as being implemented in accordance with Java™ object-oriented programming techniques, and more specifically, with resources of the Java Development Kit (JDK) 1.1, available from Sun Microsystems, Inc., Mountain View, Calif. However, it should be appreciated that the aspects of the present invention may be achieved in other programming environments that provide substantially equivalent functionality, as is well appreciated by those skilled in the art.

Figure 1:
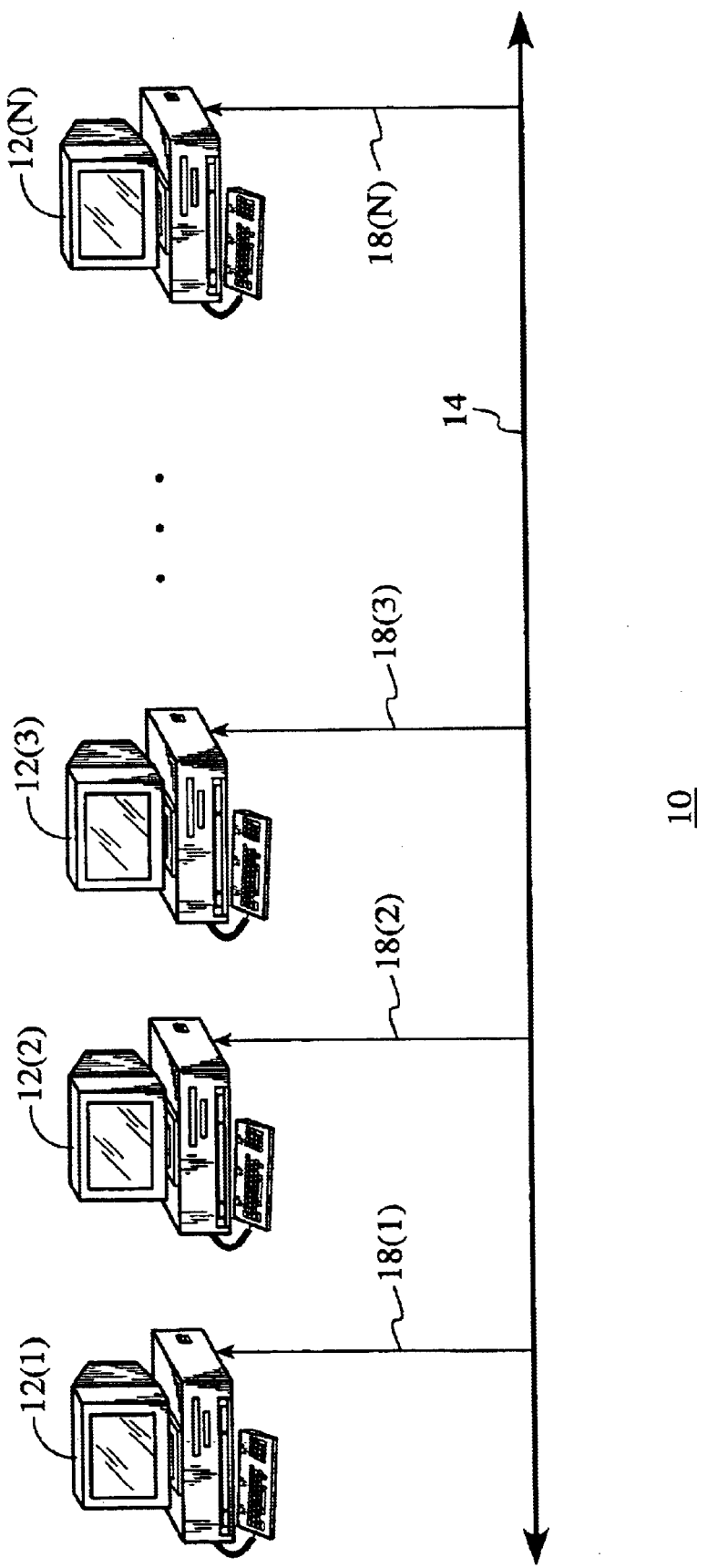
FIG. 1 illustrates a functional block diagram of a computer network arrangement with certificate generation-in accordance with the present invention.

FIG. 1 illustrates a functional block diagram of a computer network arrangement 10 with certificate generation in accordance with the present invention. As shown in FIG. 1, computer network 10 includes a plurality of computers 12(1) through 12(N) (generally referred to herein as 12) interconnected by a communication link 14. At least some of the computers 12 are in the form of personal computers or computer workstations, each of which includes a system unit, a video display unit, and operator input devices, such as a keyboard and mouse, as is conventionally known. The system unit generally includes processing, memory, and mass storage devices, such as disk and/or tape storage elements, and other elements (not separately shown), including network interface devices 18 for interfacing the computers 12 to the communication link 14. A video display unit permits the computer to display processed data and processing status to the user, and an operator input device enables the user to input data and control processing by the computer. The computers 12 transfer information, in the form of messages, through their respective network devices 18 among each other over the communication link 14.

The network 10 is suitably organized in a conventional 'client-server' configuration, in which various ones of the computers 12 act as clients and servers. The communication link 14 interconnecting the clients 12 in the network 10 may, as is conventional, comprise wires, optical fibers, or other suitable media for carrying signals representing information among the computers 12. In addition the computer link 14 may comprise a public telephony system and/or the Internet, over which a person using computer 12 may access information, including programs and data from a 'server' computer which may be located some distance from a 'client' computer, as is well understood by those skilled in the art. Through the present invention, generation and distribution of certificates for digitally authenticated communication between Java™ applications operating on computers 12 via communication link 14 is achieved.

Figure 2:
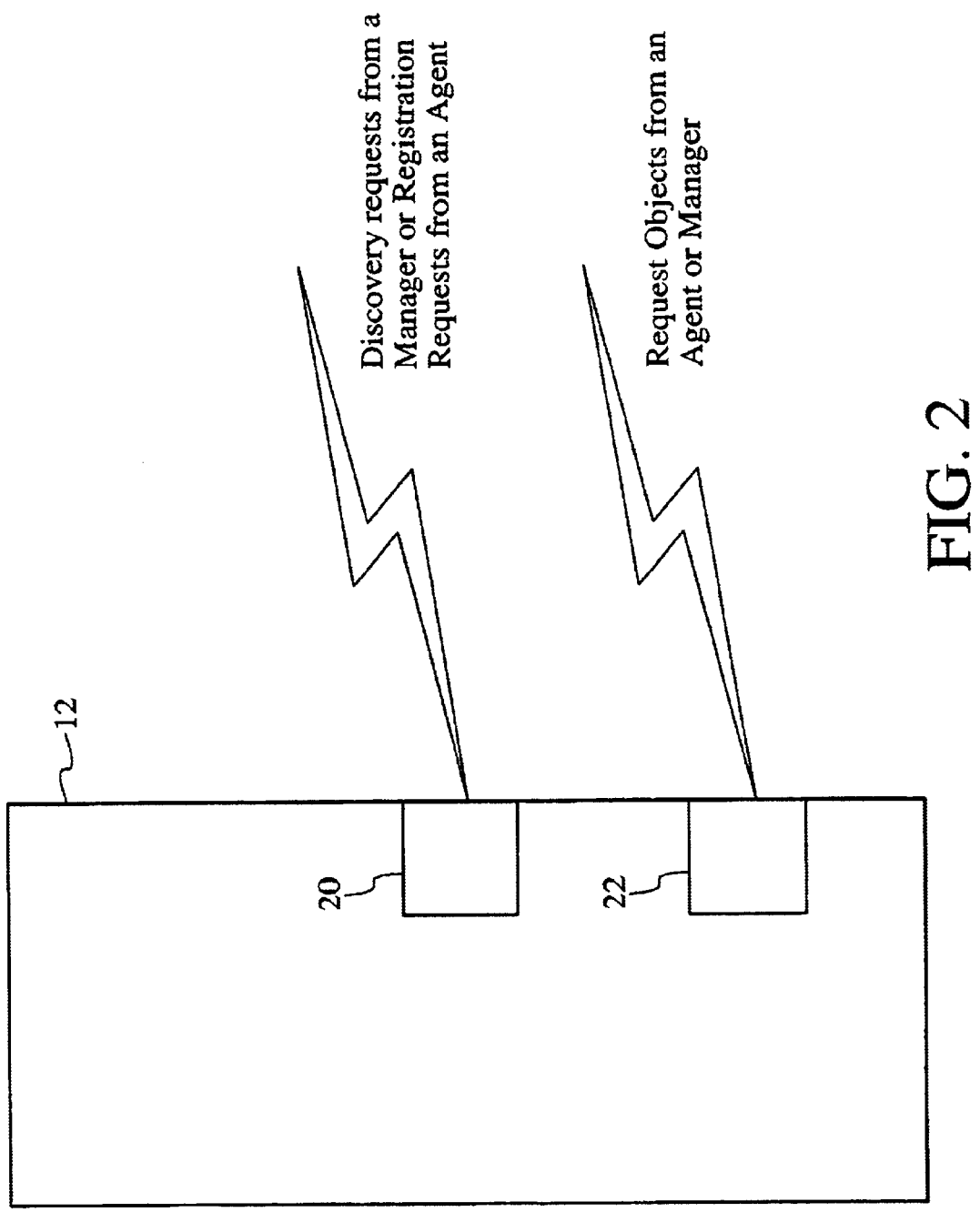
FIG. 2 illustrates a block diagram of a computer system including a registration/discovery port for a preferred embodiment.

In a preferred embodiment, each of the computers 12 includes two ports, a registration/discovery port 20 and an object port 22, as shown in FIG. 2. The registration/discovery port 20 is suitably utilized in identifying network participants, and in the generation of certificates for authenticated channel communication in accordance with the present invention. In a preferred embodiment, communication over the object port 22 utilizes a digitally signed exchange of objects using object serialization and DSA (digital signature algorithm) signatures, the operation of which is not included in the discussion of the present invention, but an exemplary implementation of which may be found in co-pending U.S. Patent application, entitled METHOD AND SYSTEM FOR THE EXCHANGE OF DIGITALLY SIGNED OBJECTS OVER AN INSECURE NETWORK, filed Jun. 10, 1998, U.S. Ser. No. 09/095,453, and assigned to the assignee of the present invention.

Figure 3:
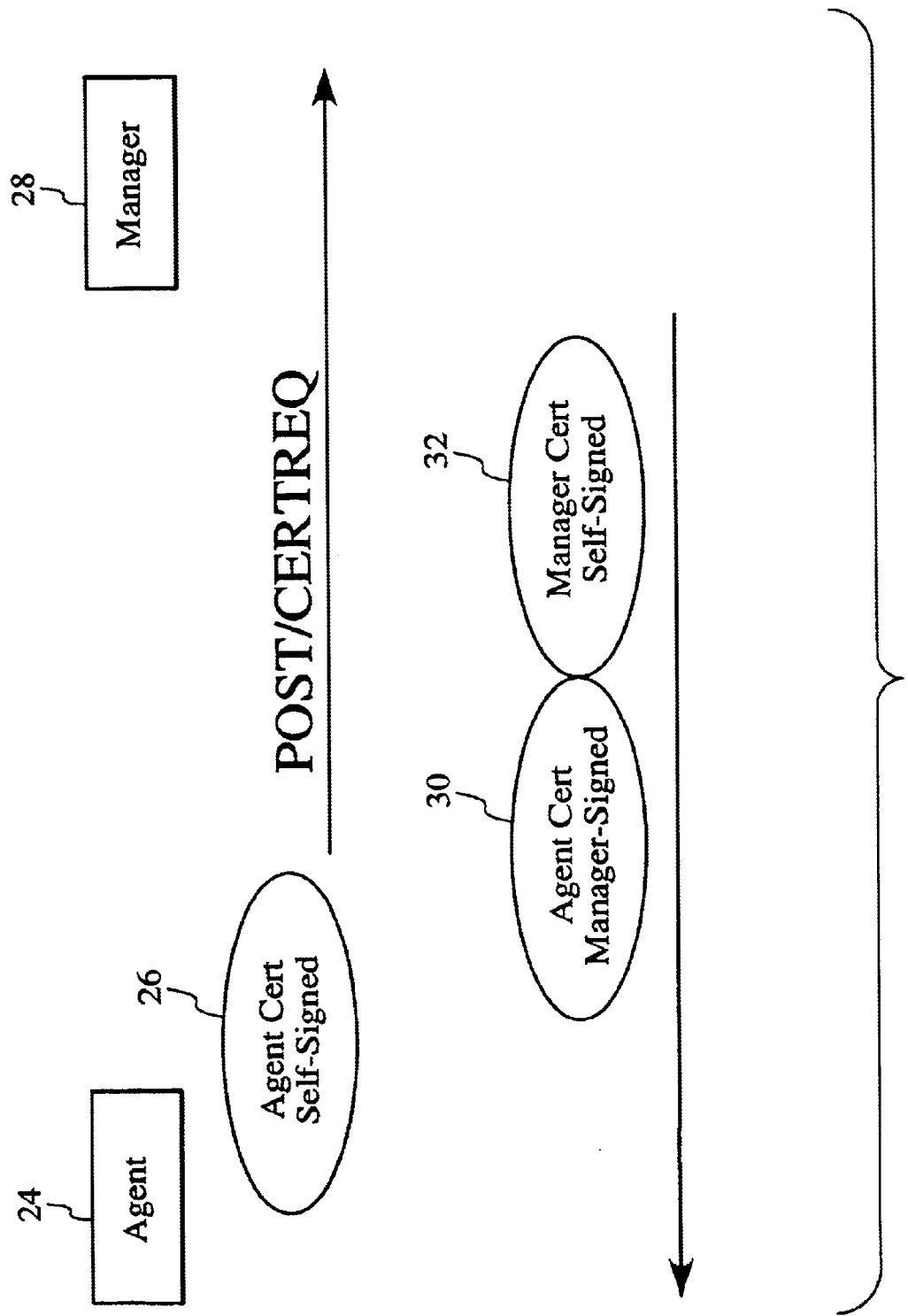
FIG. 3 illustrates a block diagram of a process for certificate generation in accordance with the present invention via the registration/discovery port of FIG. 2.

The protocol used on the registration/discovery port 20 is preferably as on HTTP (hypertext transfer protocol). Like HTTP, the session established on the port 20 is a straightforward request-response exchange. A block diagram of a process for certificate generation in accordance with the present invention via registration/discovery port 20 is presented with reference to FIG. 3. The process is suitably provided via a computer readable medium, e.g., memory, floppy disk, hard disk, etc. In order to generate a certificate, a computer system 12 acting as an agent 24 first generates a self-signed certificate 26. The self-signed certificate suitably contains the distinguished name and public key of the agent 24. The agent 24 then passes the self-signed certificate and makes a request for a certificate to a computer system 12 acting as a manager 28 through a POST/CERTREQ request.

The manager 28 validates the self-signed certificate 26 and generates a manager-signed certificate 30 for the agent 24. Thus, the response from the manager 28 comprises a sequence of the manager-signed certificate for the agent 30 and a copy of a self-signed certificate 32 for the manager.

The content of the POST/CERTREQ request from the agent 24 suitably comprises a self-signed X.509 certificate for the agent 24 in DER (distinguished encoding rules) format that has been BASE64 encoded. By way of example, the following Java™ code capably generates a key pair for an agent 24 and creates a self-signed certificate 26 for the agent 24 using the key pair:

// make a DSA key pair for the signer
KeyPairGenerator keygen=KeyPairGenerator.getInstance ("DSA");
keygen.initialize(512, newSecureRandom( ));
KeyPair kp=keygen.generateKeyPair( );
// create a self-signed x509 certificate using the key pair generated X500Name signerX500=new X500Name (signerName, signerOrgUnit, signerOrg, signerCountry);
X509Cert cert=new X509Cert(signerX500, (X509Key) kp.getPublic( ), now, expires);
AlgorithmId algId=((PKCS8Key)(kp.getPrivate( )).getAlgorithmId( );
X500Signer caSigner=cert.getSigner(algId, kp.getPrivate( ));
cert.encodeAndSign(serial, caSigner);

The content of the response from manager 28 suitably comprises a DER sequence of two certificates. The sequence is preferably BASE64 encoded and consists of the agent certificate signed by the manager 30 and a self-signed certificate 32 for the manager. By way of example, the following Java™ code capably generates a signed certificate from manager 28 based on a self-signed certificate input from agent 24:

```
X509Cert agentCert, cert;    // cert being the manager's certificate 32
KeyPair kp;                  // kp having the manager's key pair
```

AlgorithmId algId=((PKCS8Key)(kp.getPrivate( ))).getAlgorithmId( );
X500Signer caSigner=cert.getSigner(algId, kp.getPrivate( ));
X509Cert newAgentCert=new X509Cert (agentCert.getSubjectName( ), (X509Key) agent.cert.getPublicKey( ), now, expires);
newAgentCert.encodeAndSign(serial, caSigner);

Through the present invention, an automated process for generating certificates is achieved. Rather than having to present some verification to a certificate authority that a requester is authentic in order to generate a certificate, the present invention utilizes a simple HTTP POST request between an agent system and manager system to automatically generate a certificate, thus streamlining certificate generation for use in authenticated channel communication over an insecure network.

Although the present invention has been described in accordance with the embodiments shown, one of ordinary skill in the art will readily recognize that there could be variations to the embodiments and those variations would be within the spirit and scope of the present invention. For example, although the computer systems are described as having separate registration/discovery and object ports, a communication scheme could be developed that would allow a single port to be used. Accordingly, many modifications may be made by one of ordinary skill in the art without departing from the spirit and scope of the appended claims.

What is claimed is:

1. A system for automated generation and distribution of certificates within a computer network of computer systems, the system comprising:

a first computer system, the first computer system acting as an agent system, the agent system making a request for a certificate authenticating the agent system via a first registration/discovery port of the agent system; and a second computer system, the second computer system acting as a manager system, the manager system receiving the request and automatically generating the certificate authenticating the agent system in response to the request from the agent system via a second registration/discovery port of the manager system, wherein each of the first and second registration/discovery ports identifies computer systems in the computer network such that the agent system and the manager system achieve authenticated channel communication without reliance on a certificate authority.

2. The system of claim 1 wherein the request is formed according to a hypertext transfer protocol.

3. The system of claim 2 wherein the request is in a POST request format.

4. The system of claim 1 wherein the agent system further sends a self signed certificate to the manager system when making the request.

5. The system of claim 4 wherein the manager system generates the certificate as part of a sequence of certificates.

6. The system of claim 5 wherein the sequence of certificates comprises the newly generated certificate for the agent with a manager system signature and a manager self-signed certificate.

7. The system of claim 1 wherein the agent system and the manager system perform the request and response with resources of a Java development kit.

8. A method for automated generation and distribution of certificates in a computer network of computer systems, the method comprising:

generating a request by a first computer system for a certificate authenticating the first computer system from a second computer system via a first registration/discovery port of the first computer system; and responding to the request in the second computer system by automatically generating the certificate authenticating the first computer system and distributing the certificate to the first computer system via a second registration/discovery port of the second computer system, wherein each of the first and second registration/discovery ports identifies computer systems in the computer network such that certificate generation occurs without reliance on a certificate authority.

9. The method of claim 8 wherein generating a request further comprises issuing a POST/CERTREQ request.

10. The method of claim 8 wherein generating a request further comprises sending a self-signed certificate from the first computer system to the second computer system.

11. The method of claim 10 wherein automatically generating the certificate further comprises sending a sequence of certificates to the first computer system.

12. The method of claim 11 wherein sending a sequence of certificates further comprises the newly generated certificate of the first computer system with a signature from the second computer system and a self-signed certificate from the second computer system.

13. The method of claim 8 wherein the certificate is formed through resources of a Java development kit.

14. A computer readable medium containing program instructions for automated generation and distribution of certificates in authenticated channel communication over an insecure computer network of computer systems, the program instructions comprising:

supporting a request by a first computer system for a certificate authenticating the first computer system from a second computer system via a first registration/discovery port of the first computer system; and providing a response to the request in the second computer system by automatically generating the certificate authenticating the first computer system and distributing the certificate to the first computer system via a second registration/discovery port of the second computer system, wherein each of the first and second registration/discovery ports identifies computer systems in the insecure computer network such that certificate generation occurs without reliance on a certificate authority.

15. The program instructions of claim 14 wherein the request further comprises issuing a POST/CERTREQ request.

16. The program instructions of claim 14 wherein the request further comprises sending a self-signed certificate from the first computer system to the second computer system.

17. The program instructions of claim 16 wherein automatically generating the certificate further comprises sending a sequence of certificates to the first computer system.

18. The program instructions of claim 17 wherein sending a sequence of certificates further comprises sending the newly generated certificate of the first computer system with a signature from the second computer system and a self-signed certificate from the second computer system.

19. The program instructions of claim 14 further being provided through resources of a Java development kit.

20. A network that allows for automated generation and distribution of certificates, the system comprising:

a plurality of computer systems, each of the computer systems including a port for making a request for a certificate authenticating the computer system and for generating a certificate authenticating another computer system in response to a request from another computer system, wherein the port identifies each of the plurality of computer systems such that authenticated channel communication can be achieved without reliance on a certificate authority.

21. A computer system which is utilized in a network which allows for automated generation and distribution of certificates, the computer system comprising:

a network device; and a port coupled to the network device, the port for making a request for a certificate authenticating the computer system and for generating a certificate authenticating another computer system in response to a request from another computer system, wherein the port identifies each of the other computer systems on the network such that authenticated channel communication can be achieved without reliance on a certificate authority.

22. A system for automated generation and distribution of certificates within a computer network of computer systems, the system comprising:

a first computer system, the first computer system acting as an agent system, the agent system making a request for a certificate authenticating the agent system via a first registration/discovery port of the agent system; and a second computer system, the second computer system acting as a manager system, the manager system receiving the request and automatically generating the certificate authenticating the agent system in response to the request from the agent system via a second registration/discovery port of the manager system, wherein each of the first and second registration/discovery ports identifies computer systems in the computer network such that the agent system and the manager system achieve authenticated channel communication without reliance on a certificate authority, wherein the agent system further sends a self-signed certificate to the manager system when making the request, and the manager system generates the certificate as part of a sequence of certificates, wherein the sequence of certificates comprises the newly generated certificate for the agent with a manager system signature and a manager self-signed certificate.

23. A method for automated generation and distribution of certificates in a computer network of computer systems, the method comprising:

generating a request by a first computer system for a certificate authenticating the first computer system from a second computer system via a first registration/discovery port of the first computer system, wherein generating a request further comprises sending a self-signed certificate from the first computer system to the second computer system; and responding to the request in the second computer system by automatically generating the certificate authenticating the first computer system and distributing the certificate to the first computer system via a second registration/discovery port of the second computer system, wherein each of the first and second registration/discovery ports identifies computer systems in the computer network such that certificate generation occurs without reliance on a certificate authority, and wherein automatically generating the certificate further comprises sending a sequence of certificates to the first computer system, wherein the sequence of certificates comprises the newly generated certificate of the first computer system with a signature from the second computer system and a self-signed certificate from the second computer system.

24. A computer readable medium containing program instructions for automated generation and distribution of certificates in authenticated channel communication over an insecure computer network of computer systems, the program instructions comprising:

supporting a request by a first computer system for a certificate authenticating the first computer system from a second computer system via a first registration/discovery port of the first computer system, wherein the request further comprises sending a self-signed certificate from the first computer system to the second computer system; and providing a response to the request in the second computer system by automatically generating the certificate authenticating the first computer system and distributing the certificate to the first computer system via a second registration/discovery port of the second computer system, wherein each of the first and second registration/discovery ports identifies computer systems in the insecure computer network such that certificate generation occurs without reliance on a certificate authority, wherein automatically generating the certificate further comprises sending a sequence of certificates to the first computer system, and wherein sending a sequence of certificates further comprises sending the newly generated certificate of the first computer system with a signature from the second computer system and a self-signed certificate from the second computer system.

* * * * *